(12) United States Patent
Kim et al.

(10) Patent No.: US 9,210,774 B2
(45) Date of Patent: Dec. 8, 2015

(54) APPARATUS AND METHOD FOR CONTROLLING LIGHTING

(71) Applicant: ELECTRONICS AND TELECOMMUNICATIONS RESEARCH INSTITUTE, Daejeon (KR)

(72) Inventors: Hyun-Jong Kim, Cheongju-si (KR); You-Jin Kim, Daejeon (KR); Dae-Ho Kim, Daejeon (KR); Hyun-Seok Kim, Daejeon (KR); Tae-Gyu Kang, Daejeon (KR); Hyun-Chul Kang, Daejeon (KR); Hyun-Joo Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/504,389

(22) Filed: Oct. 1, 2014

(65) Prior Publication Data

US 2015/0115804 A1 Apr. 30, 2015

(30) Foreign Application Priority Data

Oct. 29, 2013 (KR) .................. 10-2013-0129373
Mar. 26, 2014 (KR) .................. 10-2014-0035138

(51) Int. Cl.
*H05B 37/02* (2006.01)
(52) U.S. Cl.
CPC ........ *H05B 37/0218* (2013.01); *H05B 37/0245* (2013.01)

(58) Field of Classification Search
USPC ......... 315/149, 152, 291, 294, 297, 307, 312, 315/360
See application file for complete search history.

(56) References Cited

U.S. PATENT DOCUMENTS

| | | | | |
|---|---|---|---|---|
| 4,733,138 A | * | 3/1988 | Pearlman et al. | 315/307 |
| 6,057,654 A | * | 5/2000 | Cousy et al. | 315/308 |
| 2006/0125426 A1 | * | 6/2006 | Veskovic et al. | 315/312 |
| 2012/0212140 A1 | | 8/2012 | Kim et al. | |
| 2013/0234607 A1 | | 9/2013 | Kim et al. | |
| 2015/0084547 A1 | * | 3/2015 | Yeh et al. | 315/312 |

FOREIGN PATENT DOCUMENTS

KR 10-2012-0095153 A 8/2012

* cited by examiner

*Primary Examiner* — Tung X Le
(74) *Attorney, Agent, or Firm* — Rabin & Berdo, P.C.

(57) ABSTRACT

An apparatus and method for controlling lighting are disclosed. The apparatus includes a reception unit, a determination unit, a state determination unit, and a lighting control command transmission unit. The reception unit receives an event message from a light sensor. The determination unit determines whether the event message is an event message attributable to a change in luminance or an event message related to a DALI system. If it is determined that the event message is the event message attributable to a change in the luminance, the state determination unit determines the luminance change state of a lit space using the event message attributable to a change in the luminance. The lighting control command transmission unit sends a lighting control command corresponding to the luminance change state using a control group address.

18 Claims, 8 Drawing Sheets

| Event name | Event flag | Description |
| --- | --- | --- |
| Move to more than minimum setpoint | 0b00 0000 0001 | Brightness has been moved to more than minimum setpoint |
| Move to more than maximum setpoint | 0b00 0000 0010 | Brightness has been moved to more than maximum setpoint |
| Move to less than maximum setpoint | 0b00 0000 0100 | Brightness has been moved to less than maximum setpoint |
| Move to less than minimum setpoint | 0b00 0000 1000 | Brightness has been moved to less than minimum setpoint |
| Changing the setpoint | 0b00 0001 0000 | Setpoint level of LS has been changed by DALI command |
| Changing the setpoint tolerance | 0b00 0010 0000 | Setpoint tolerance level has been changed by DALI command |
| Changing the sensing interval | 0b00 0100 0000 | Sensing interval has been changed by DALI command |
| Changing the control group address | 0b00 1000 0000 | The control group address has been changed by DALI command |
| Setting loss | 0b01 0000 0000 | Settings are lost due to the system error |

FIG. 4

| Setpoint level | Relative brightness | Setpoint level | Relative brightness | Setpoint level | Relative brightness | Setpoint level | Relative brightness | Setpoint level | Relative brightness |
|---|---|---|---|---|---|---|---|---|---|
| 1 | 0.100 | 2 | 0.103 | 3 | 0.106 | 4 | 0.109 | 5 | 0.112 |
| 6 | 0.115 | 7 | 0.118 | 8 | 0.121 | 9 | 0.124 | 10 | 0.128 |
| 11 | 0.131 | 12 | 0.135 | 13 | 0.139 | 14 | 0.143 | 15 | 0.147 |
| 16 | 0.151 | 17 | 0.155 | 18 | 0.159 | 19 | 0.163 | 20 | 0.168 |
| 21 | 0.173 | 22 | 0.177 | 23 | 0.182 | 24 | 0.187 | 25 | 0.193 |
| 26 | 0.198 | 27 | 0.203 | 28 | 0.209 | 29 | 0.215 | 30 | 0.221 |
| . . . . | . . . . | . . . . | . . . . | . . . . | . . . . | . . . . | . . . . | . . . . | . . . . |
| 246 | 80.378 | 247 | 82.603 | 248 | 84.889 | 249 | 87.239 | 250 | 89.654 |
| 251 | 92.135 | 252 | 97.686 | 253 | 97.307 | 254 | 100.000 | | |

FIG. 6

| Command name | Address byte | Instance byte | Opcode byte | DTR0 | DTR1 | DTR2 | ANSWER | Send twice |
|---|---|---|---|---|---|---|---|---|
| QUERY LS SETPOINT | Device | Instance | 0xA0 | | | | ✓ | |
| QUERY LS SETPOINT TOLERANCE | Device | Instance | 0xA1 | | | | ✓ | |
| QUERY LS CONTROL GROUP ADDRESS | Device | Instance | 0xA2 | | | | ✓ | |
| QUERY LS SENSING INTERVAL | Device | Instance | 0xA3 | | | | ✓ | |
| QUERY LS AMBIENT LEVEL | Device | Instance | 0xA4 | | | | ✓ | |
| SET LS SETPOINT | Device | Instance | 0x70 | ✓ | | | | ✓ |
| SET LS SETPOINT TOLERANCE | Device | Instance | 0x71 | ✓ | | | | ✓ |
| SET LS CONTROL GROUP ADDRESS | Device | Instance | 0x72 | ✓ | | | | ✓ |
| SET LS SENSING INTERVAL | Device | Instance | 0x73 | ✓ | | | | ✓ |
| SET LS MAX AMBIENT | Device | Instance | 0x74 | | | | | ✓ |

FIG. 7

APPARATUS AND METHOD FOR CONTROLLING LIGHTING

CROSS REFERENCE TO RELATED APPLICATIONS

This application claims the benefit of Korean Patent Application Nos. 10-2013-0129373 and 10-2014-0035138, filed Oct. 29, 2013 and Mar. 26, 2014, respectively, which are hereby incorporated by reference in their entirety into this application.

BACKGROUND OF THE INVENTION

1. Technical Field

The present invention relates generally to an apparatus and method for controlling lighting and, more particularly, to an apparatus and method for controlling lighting using the luminance of a lit space measured by a light sensor in a digital addressable lighting interface (DALI)-based lighting network environment.

2. Description of the Related Art

To cope with growing power demand, current lighting apparatuses have developed into lighting control systems that are capable of automatically and appropriately controlling the luminance of a lit space depending on surrounding luminance in order to prevent the use of unnecessary lighting, to a degree that is beyond the simple control of lighting using on/off switches. A representative lighting control protocol and system is a DALI standard. The DALI standard can meet the needs of a lighting user by assigning addresses to each light and each control device or assigning an address to a group of lights and a control device.

For example, Korean Patent Application Publication No. 10-2012-0095153 entitled "Light Control Device and Method Based on DALI Communication" discloses a technology that is capable of locally or remotely controlling one or more DALI masters using a server.

As described above, according to the DALI standard, multiple DALI control devices can be installed, the concept of an input device is introduced, and lighting can be controlled using a light sensor, that is, one of the input devices.

The light sensor generates an event message when the luminance of a lit space and a set parameter change, and sends the event message to an application controller. The application controller may analyze the event message and control the lighting.

However, a scheme for detecting whether or not the light sensor has generated an event and a scheme for setting the parameters of the light sensor are insufficient.

If the lighting is controlled based on absolute luminance (Lux) measured by the light sensor, a problem arises in that the absolute luminance may be differently measured depending on the location where the light sensor is installed, the type of light sensor, and the reflection coefficient of a lit space. Furthermore, if a lit space and the location where the light sensor is installed change, it is necessary to change the operating setpoint of the light sensor. There is no provision for a scheme for controlling and setting the operating setpoint using the DALI protocol.

SUMMARY OF THE INVENTION

Accordingly, the present invention has been made keeping in mind the above problems occurring in the conventional art, and an object of the present invention is to provide an apparatus and method for controlling lighting using the luminance of a lit space measured by a light sensor in a DALI-based lighting network environment.

In accordance with an aspect of the present invention, there is provided a method of controlling lighting, including receiving, by an apparatus for controlling lighting, event messages from a light sensor; if the event messages are attributable to a change in the luminance, determining whether the event messages corresponding to a luminance change from a first luminance darker than a setpoint to a second luminance brighter than the setpoint are continuously received or whether the event messages corresponding to a luminance change from a third luminance brighter than the setpoint to a fourth luminance darker than the setpoint are continuously received; determining whether the luminance of a lit space becomes brighter than or darker than the setpoint based on results of the determination; and sending a command to control corresponding lighting based on results of the determination.

Determining whether the luminance of the lit space becomes brighter than or darker than the setpoint may include, if a first event message, corresponding to a luminance change from a state darker than a minimum setpoint to a state brighter than the minimum setpoint, and a second event message, corresponding to a luminance change from a state darker than a maximum setpoint to a state brighter than the maximum setpoint, are continuously received, determining the luminance of the lit space becomes brighter than the setpoint.

Determining whether the luminance of the lit space becomes brighter than or darker than the setpoint may include, if a first event message, corresponding to a luminance change from a state brighter than a maximum setpoint to a state darker than the maximum setpoint, and a second event message, corresponding to a luminance change from a state brighter than a minimum setpoint to a state darker than the minimum setpoint, are continuously received, determining the luminance of the lit space becomes darker than the setpoint.

Sending the command may include, if it is determined that the luminance of the lit space becomes brighter than the setpoint, sending a light-off control command to deactivate the lighting or reduce a brightness of the lighting.

Sending the command may include, if it is determined that the luminance of the lit space becomes darker than the setpoint, sending a light-on control command to activate the lighting or increase a brightness of the lighting.

The method may further include, if the event message is an event message related to a DALI system, determining whether an event corresponding to a case where set light sensor parameters of the light sensor have been lost has been generated or an event corresponding to a case where the set light sensor parameters have been changed by another apparatus for controlling lighting has been generated based on the event message; if it is determined that the event corresponding to the case where set light sensor parameters of the light sensor have been lost has been generated, setting the light sensor to set values of the light sensor that have been previously stored using a light sensor parameter setting command; and, if it is determined that the event corresponding to the case where the set light sensor parameters have been changed, confirming information about the changed set parameters using a light sensor parameter request command.

Sending the command may be performed using a control group address.

The setpoint may be set using a relative brightness to a maximum brightness of the lit space where the light sensor has been installed.

In accordance with another aspect of the present invention, there is provided an apparatus for controlling lighting, including a reception unit configured to receive an event message from a light sensor; a determination unit configured to determine whether the event message is an event message attributable to a change in luminance or an event message related to a DALI system; a state determination unit configured to, if it is determined that the event message is the event message attributable to a change in the luminance, determine the luminance change state of a lit space using the event message attributable to a change in the luminance; and a lighting control command transmission unit configured to send a lighting control command corresponding to the luminance change state using a control group address.

The state determination unit, if a first event message, corresponding to a luminance change from a state darker than a minimum setpoint to a state brighter than the minimum setpoint, and a second event message, corresponding to a luminance change from a state darker than a maximum setpoint to a state brighter than the maximum setpoint, are continuously received, may determine that the luminance of the lit space becomes brighter than the setpoint.

The state determination unit, if a first event message, corresponding to a luminance change from a state brighter than a maximum setpoint to a state darker than the maximum setpoint, and a second event message, corresponding to a luminance change from a state brighter than a minimum setpoint to a state darker than the minimum setpoint, are continuously received, may determine the luminance of the lit space becomes darker than the setpoint.

The lighting control command transmission unit, if the luminance change state is a state in which the luminance of the lit space becomes brighter than the setpoint, may send a light-off control command to deactivate lighting or reduce the brightness of the lighting.

The lighting control command transmission unit, if the luminance change state is a state in which the luminance of the lit space becomes darker than the setpoint, may send a light-on control command to activate the lighting or increase the brightness of the lighting.

The apparatus may further include an event determination unit configured to, if the event message is an event message related to the DALI system, determine whether an event corresponding to a case where set light sensor parameters of the light sensor have been lost has been generated or an event corresponding to a case where the set light sensor parameters have been changed by another apparatus for controlling lighting has been generated based on the event message; and a parameter command transmission unit configured to send a light sensor parameter command based on the results of the determination of the event determination unit.

The parameter command transmission unit may be further configured to, if it is determined that the event corresponding to the case where set light sensor parameters of the light sensor have been lost has been generated, set the light sensor to set values of the light sensor that have been previously stored using a light sensor parameter setting command.

The parameter command transmission unit may be further configured to, if it is determined that the event corresponding to the case where the set light sensor parameters have been changed, confirm information about the changed set parameters using a light sensor parameter request command.

The set light sensor parameters may include the setpoint, a setpoint tolerance, and the control group address.

The state determination unit may require the setpoint used to determine the luminance change state; and the setpoint may be set using a relative brightness to a maximum brightness of the lit space where the light sensor has been installed.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram illustrating the event names of a light sensor and information about the encoding of flags according to an embodiment of the present invention;

FIG. 6 is a diagram illustrating the setpoint levels of the light sensor according to an embodiment of the present invention;

FIG. 7 is a diagram illustrating DALI commands for the light sensor according to an embodiment of the present invention.

DESCRIPTION OF THE PREFERRED EMBODIMENTS

Figure 1:
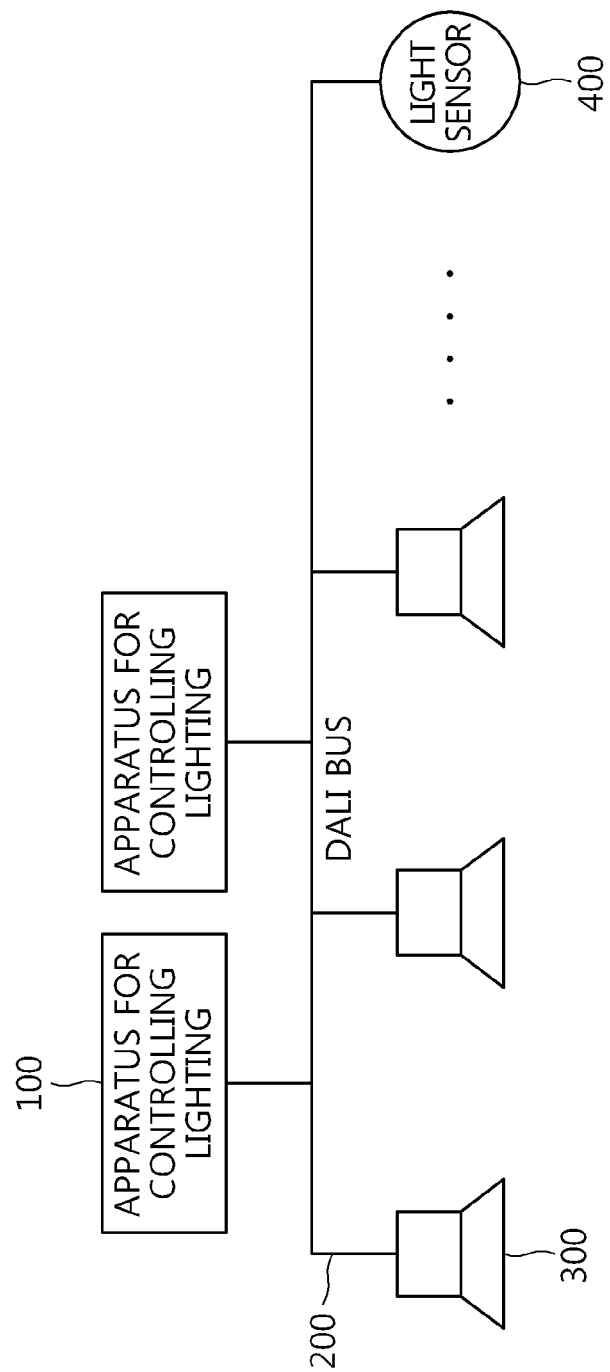
FIG. 1 is a diagram illustrating an environment to which an apparatus for controlling lighting according to an embodiment of the present invention is applied.

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

An apparatus and method for controlling lighting using the luminance of a lit space measured by a light sensor in a DALI-based lighting network environment according to embodiments of the present invention are described in detail with reference to the accompanying drawings.

FIG. 1 is a diagram illustrating an environment to which an apparatus for controlling lighting according to an embodiment of the present invention is applied.

The apparatus 100 for controlling lighting according to this embodiment of the present invention corresponds to a DALI application controller that controls lighting in a DALI-based lighting network environment.

Referring to FIG. 1, the apparatus 100 for controlling lighting may control DALI control gears 300 connected to a DALI bus 200 using DALI commands, and may receive event messages from a light sensor 400.

Events that may be generated by the light sensor 400 according to this embodiment of the present invention may include an event attributable to a change in luminance measured by the light sensor 400 and an event related to a DALI system, but are not limited thereto.

The apparatus 100 for controlling lighting is described in detail below with reference to FIG. 2.

Figure 2:
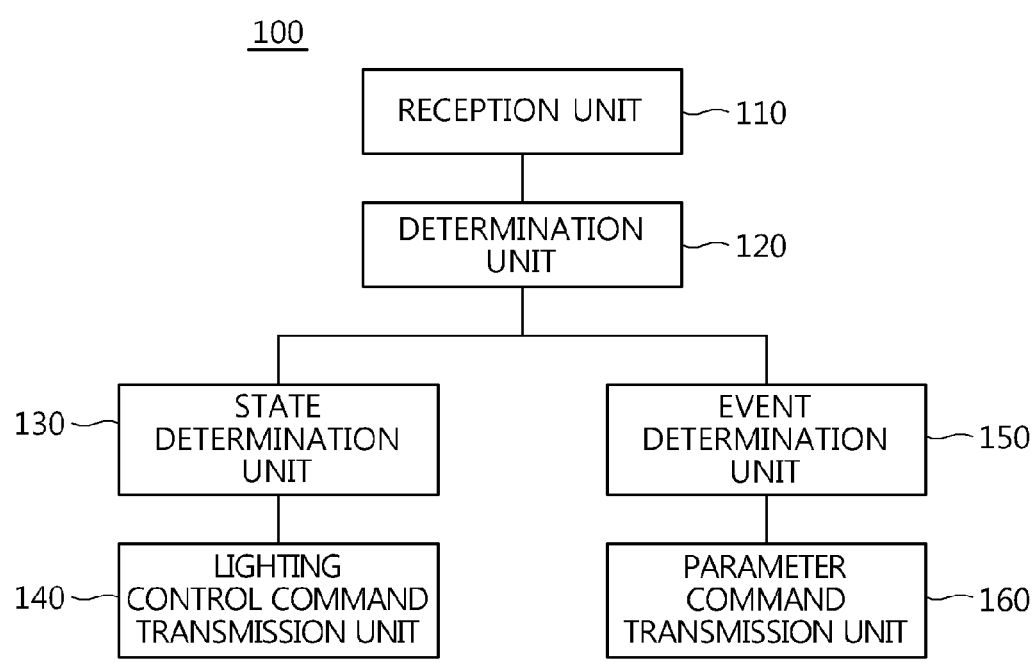
FIG. 2 is a block diagram of the apparatus for controlling lighting according to an embodiment of the present invention.

FIG. 2 is a block diagram of the apparatus 100 for controlling lighting according to an embodiment of the present invention.

Referring to FIG. 2, the apparatus 100 for controlling lighting includes a reception unit 110, a determination unit 120, a state determination unit 130, a lighting control command transmission unit 140, an event determination unit 150, and a parameter command transmission unit 160.

The reception unit 110 receives event messages from the light sensor 400.

The determination unit 120 determines whether an event message received by the reception unit 110 is an event message attributable to a change in luminance measured by the light sensor 400 or an event message related to a DALI system.

If, as a result of the determination, it is determined that the event message is an event message attributable to a change in luminance, the state determination unit 130 determines the current luminance change state of a lit space using the event message attributable to a change in luminance.

A setpoint used to determine whether or not an event has occurred is required for the state determination unit 130 to define an event attributable to a change in luminance, and a setpoint tolerance used to set the sensitivity of response to a change in luminance.

Figure 3:
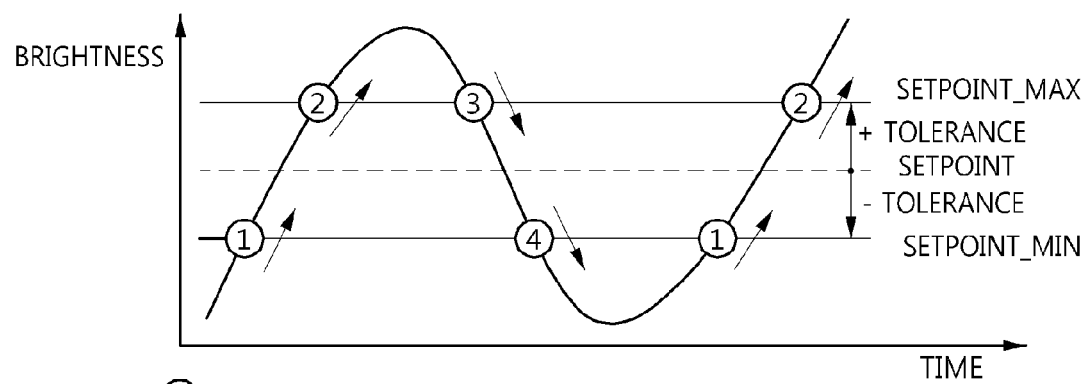
FIG. 3 is a diagram illustrating an event according to luminance that varies over time according to an embodiment of the present invention.

The luminance of the lit space may be defined as an event, as illustrated in FIG. 3, because the luminance attributable to the amount of external light continuously changes over time.

Referring to FIG. 3, (1) is an event indicative of the case where luminance becomes brighter than the minimum setpoint in the state in which the luminance is darker than the minimum setpoint.

(2) is an event indicative of the case where luminance becomes brighter than the maximum setpoint in the state in which the luminance is darker than the maximum setpoint.

(3) is an event indicative of the case where the luminance becomes darker than the maximum setpoint in the state in which the luminance is brighter than the maximum setpoint.

(4) is an event indicative of the case where the luminance becomes darker than the minimum setpoint in the state in which the luminance is brighter than the minimum setpoint.

If event messages corresponding to (1) and (2) are continuously received, the state determination unit 130 determines that the luminance of the lit space becomes brighter than the setpoint.

If event messages corresponding to (3) and (4) are continuously received, the state determination unit 130 determines that the luminance of the lit space becomes darker than the setpoint.

The lighting control command transmission unit 140 sends the results of the determination performed by the state determination unit 130, that is, a lighting control command corresponding to the current luminance change state of the lit space, using a control group address.

More specifically, if the luminance of the lit space becomes brighter than the setpoint, the lighting control command transmission unit 140 sends a light-off control command to deactivate the lighting of a corresponding lit space or reduce the brightness of the lighting of the corresponding lit space.

If the luminance of the lit space becomes darker than the setpoint, the lighting control command transmission unit 140 sends a light-on control command to activate the lighting of a corresponding lit space or increase the brightness of the lighting of the corresponding lit space.

The apparatus 100 for controlling lighting may become aware of a change in current luminance in a lit space by receiving an event message generated by the light sensor 400 based on a change in detected luminance and then analyzing the received event message, as described above.

If the event message is an event message related to a DALI system, the event determination unit 150 determines whether the event message is a set light sensor parameter loss event or a set light sensor parameter change event. In this case, set light sensor parameters may include a setpoint, a setpoint tolerance, and a control group address.

If a light sensor has lost its set light sensor parameters because of a system error, the parameter command transmission unit 160 sets the light sensor to the setpoints of the light sensor, included in the parameter command transmission unit 160, using a light sensor parameter setting command.

If a set light sensor parameter has been changed by another apparatus for controlling lighting, the parameter command transmission unit 160 becomes aware of information about the changed parameter using a light sensor parameter request command.

An event related to a DALI system according to an embodiment of the present invention is generated when a set light sensor parameter is changed by one of a plurality of apparatus for controlling lighting in the state in which the plurality of apparatus for controlling lighting has been connected, or when set light sensor parameters are lost because of a system error.

As described above, the apparatus 100 for controlling lighting transfers a change of a set light sensor parameter to other apparatuses for controlling lighting using an event message so that the other apparatuses for controlling lighting may become aware of the state of the light sensor 400.

The event names of the light sensor 400 and information about the encoding of flags are illustrated in FIG. 4.

FIG. 4 is a diagram illustrating the event names of the light sensor and information about the encoding of flags according to an embodiment of the present invention.

Referring to FIG. 4, in the present invention, a 24-bit event message is used to transfer the details of an event generated by the light sensor 400 to the apparatus 100 for controlling lighting. The details of the event are transferred to the apparatus 100 for controlling lighting via a predetermined event flag.

A method of controlling lighting according to an embodiment of the present invention is described in detail below with reference to FIG. 5.

Figure 5:
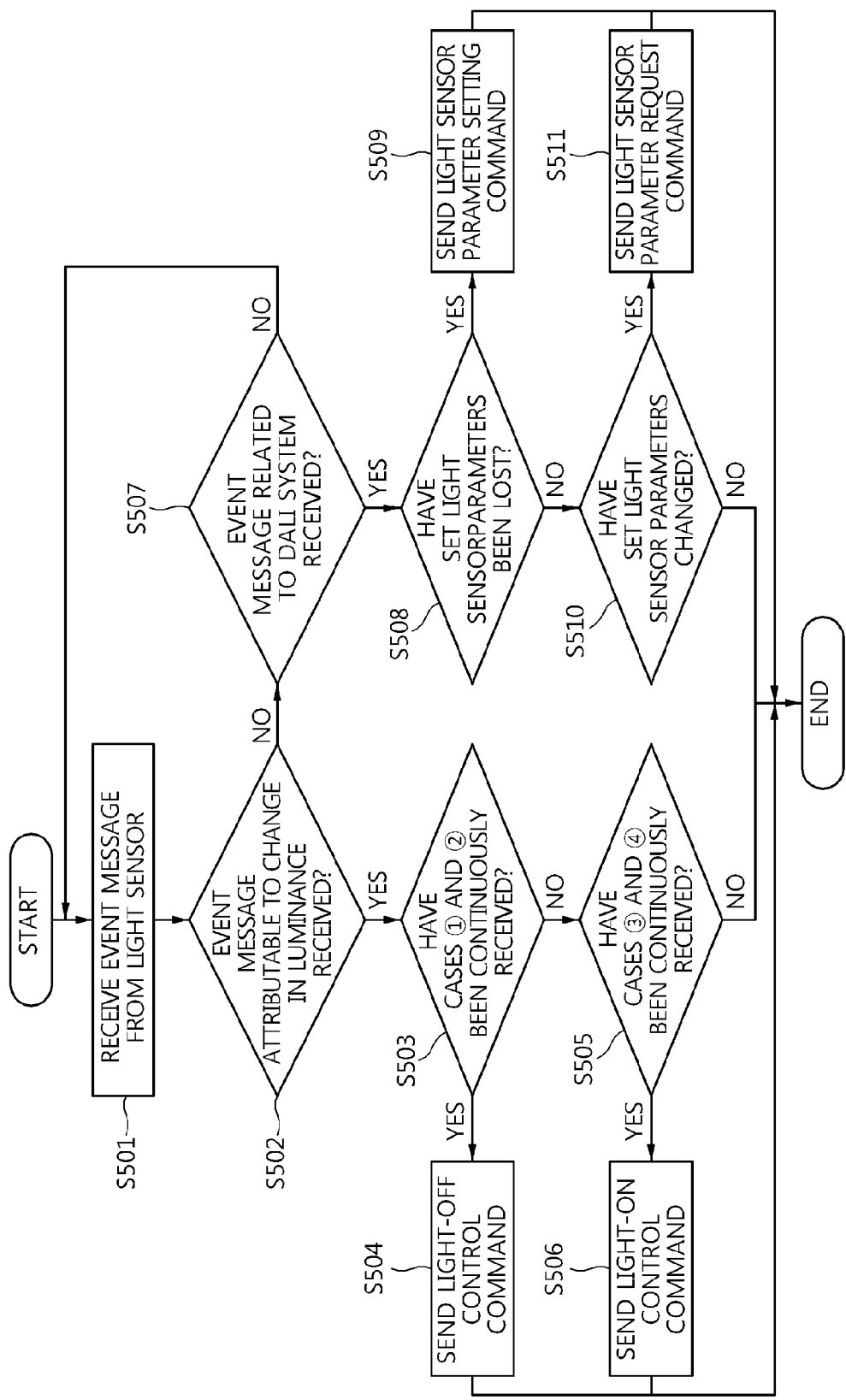
FIG. 5 is a flowchart illustrating a method of controlling lighting according to an embodiment of the present invention.

FIG. 5 is a flowchart illustrating the method of controlling lighting according to this embodiment of the present invention.

Referring to FIG. 5, the apparatus 100 for controlling lighting receives an event message from the light sensor 400 at step S501.

The apparatus 100 for controlling lighting determines whether or not the event message received at step S501 corresponds to an event message attributable to a change in luminance measured by the light sensor 400 at step S502.

If, as a result of the determination at step S502, it is determined that the event message is an event message attributable to a change in the luminance, the apparatus 100 for controlling lighting determines whether or not messages corresponding to (1) and (2) are continuously received at step S503.

If, as a result of the determination at step S503, it is determined that the messages corresponding to (1) and (2) have been continuously received, the apparatus 100 for controlling lighting determines that the luminance of a lit space becomes brighter than a setpoint and sends a light-off control command to deactivate the lighting of the lit space or reduce the brightness of the lighting at step S504.

If, as a result of the determination at step S503, it is determined that the messages corresponding to (1) and (2) have not been continuously received, the apparatus 100 for controlling lighting determines whether or not messages corresponding to (3) and (4) are continuously received at step S505.

If, as a result of the determination at step S505, it is determined that the messages corresponding to (3) and (4) have been continuously received, the apparatus 100 for controlling lighting determines that the luminance of a lit space becomes darker than a setpoint and sends a light-on control command to activate the lighting of the lit space or increasing the brightness of the lighting at step S506.

If, as a result of the determination at step S502, it is determined that the event message is not an event message attributable to a change in the luminance, the apparatus 100 for controlling lighting determines whether or not the event message corresponds to an event message related to a DALI system at step S507.

If, as a result of the determination at step S507, it is determined that the event message is an event message related to a DALI system, the apparatus 100 for controlling lighting determines whether or not the set light sensor parameters of the light sensor have been lost because of a system error at step S508.

If, as a result of the determination at step S508, it is determined that the set light sensor parameters of the light sensor have been lost, the apparatus 100 for controlling lighting sends a light sensor parameter setting command at step S509 so that the light sensor is set to the setpoints of the light sensor included in the apparatus 100 for controlling lighting.

If, as a result of the determination at step S508, it is determined that the set light sensor parameters of the light sensor have not been lost, the apparatus 100 for controlling lighting determines whether or not a set light sensor parameter has been changed by another apparatus for controlling lighting at step S510.

If, as a result of the determination at step S510, it is determined that the set light sensor parameter have been changed, the apparatus 100 for controlling lighting sends a light sensor parameter request command in order to become aware of information about the set light sensor parameters at step S511.

If a setpoint is set based on an absolute luminance measured by a light sensor, the luminance of a lit space where the light sensor has been installed is differently measured under the same conditions depending on the reflection coefficient of the lit space, the location where the light sensor has been installed, and the characteristics of the light sensor. Accordingly, the setpoint of the light sensor needs to be set using a relative brightness (%) to the maximum brightness of the lit space where the light sensor has been installed. FIG. 6 illustrates an example of the setpoint levels of a light sensor.

In order to operate a light sensor in a DALI-based lighting network environment, the apparatus 100 for controlling lighting needs to be able to become aware of the set parameters of the light sensor 400, and needs to be able to change the set parameters of the light sensor if a lit space and a control group change. For this purpose, DALI commands for the light sensor may be defined, as illustrated in FIG. 7.

Referring to FIG. 7, the apparatus 100 for controlling lighting may request information about the set parameters of a light sensor from the light sensor using a QUERY command. The information about the set parameters of the light sensor may include the setpoint, setpoint tolerance, control group address, sensing interval and current luminance level of the light sensor. The light sensor sends the requested information to the apparatus 100 for controlling lighting using a backward frame in response to the QUERY command.

Furthermore, if it is necessary to change the set parameters of a light sensor because of a change in a lit space and the location where the light sensor has been installed, the apparatus 100 for controlling lighting may change the set parameters using a SET command and DTR0.

A process in which the apparatus 100 for controlling lighting initially sets the light sensor 400 is described in detail below with reference to FIG. 8.

Figure 8:
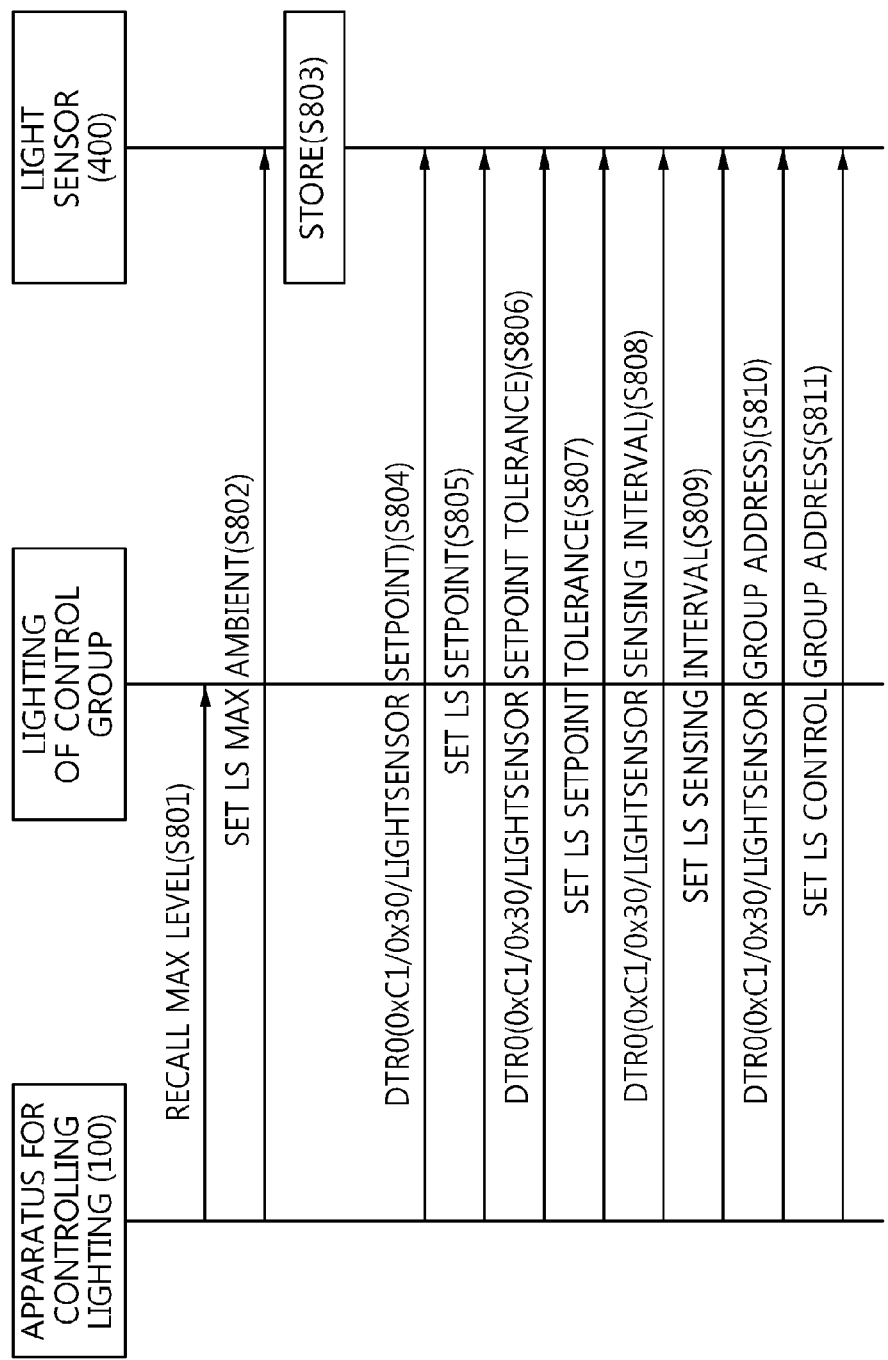
FIG. 8 is a diagram illustrating a process in which the apparatus for controlling lighting initially sets a light sensor according to an embodiment of the present invention.

FIG. 8 is a diagram illustrating the process in which the apparatus for controlling lighting initially sets the light sensor according to an embodiment of the present invention.

Referring to FIG. 8, in order to set the lighting of a control group in a lit space where the light sensor 400 has been installed to a maximum brightness, the apparatus 100 for controlling lighting sends a RECALL MAX LEVEL command to the lights of the control group using a group address at step S801. Furthermore, the apparatus 100 for controlling lighting sends a SET LS MAX AMBIENT command to the light sensor 400 at step S802 so that current luminance is stored as the maximum brightness "lightsensorMaxAmbient" of the lit space.

The light sensor 400 stores the current luminance as the maximum brightness of the lit space in response to the SET LS MAX AMBIENT command at step S803.

Thereafter, in order to set the parameters (i.e., a setpoint, a setpoint tolerance, a sensing interval, and a control group address) of the light sensor 400, the apparatus 100 for controlling lighting includes corresponding values in DTR0, transfers the DRT0 to the light sensor 400, and sends setting commands corresponding to the details of the DTR0 so that the details of the DTR0 are used as the set parameters of the light sensor 400.

More specifically, the apparatus 100 for controlling lighting includes the setpoint of the light sensor 400 in the DTR0, transfers the DTR0 to the light sensor 400 at step S804, and sends a SET LS SETPOINT command that commands the setpoint to be set as a setting parameter of the light sensor 400 to the light sensor 400 at step S805.

The apparatus 100 for controlling lighting includes the setpoint tolerance of the light sensor 400 in the DTR0, transfers the DTR0 to the light sensor 400 at step S806, and sends a SET LS SETPOINT TOLERANCE command that commands the setpoint tolerance to be set as a setting parameter of the light sensor 400 to the light sensor 400 at step S807.

The apparatus 100 for controlling lighting includes the sensing interval of the light sensor 400 in the DTR0, transfers the DTR0 to the light sensor 400 at step S808, and sends a SET LS SENSING INTERVAL command that commands the sensing interval to be set as a setting parameter of the light sensor 400 to the light sensor 400 at step S809.

The apparatus 100 for controlling lighting includes the control group address of the light sensor 400 in the DTR0, transfers the DTR0 to the light sensor 400 at step S810, and sends a SET LS CONTROL GROUP ADDRESS command that commands the control group address to be set as a setting parameter of the light sensor 400 to the light sensor 400 at step S811.

As described above, the apparatus for controlling lighting and method according to the embodiments of the present invention can determine the degree of brightness of a lit space and control lighting, regardless of the reflection coefficient of a location and space where a light sensor has been installed.

Furthermore, according to the embodiments of the present invention, if the control group of a light sensor and the characteristics of a lit space change, the set parameters of the light sensor are set or requested using the DALI bus. Accordingly, the needs of a user can be met because lighting can be actively changed in response to a change in ambient luminance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling lighting, comprising:
   receiving, by an apparatus for controlling lighting, event messages from a light sensor;
   if the event messages are attributable to a change in the luminance, determining whether the event messages corresponding to a luminance change from a first luminance darker than a setpoint to a second luminance brighter than the setpoint are continuously received or whether the event messages corresponding to a luminance change from a third luminance brighter than the setpoint to a fourth luminance darker than the setpoint are continuously received;
   determining whether the luminance of a lit space becomes brighter than or darker than the setpoint based on results of the determination; and
   sending a command to control corresponding lighting based on results of the determination.

2. The method of claim 1, wherein determining whether the luminance of the lit space becomes brighter than or darker than the setpoint comprises, if a first event message, corresponding to a luminance change from a state darker than a minimum setpoint to a state brighter than the minimum setpoint, and a second event message, corresponding to a luminance change from a state darker than a maximum setpoint to a state brighter than the maximum setpoint, are continuously received, determining the luminance of the lit space becomes brighter than the setpoint.

3. The method of claim 1, wherein determining whether the luminance of the lit space becomes brighter than or darker than the setpoint comprises, if a first event message, corresponding to a luminance change from a state brighter than a maximum setpoint to a state darker than the maximum setpoint, and a second event message, corresponding to a luminance change from a state brighter than a minimum setpoint to a state darker than the minimum setpoint, are continuously received, determining the luminance of the lit space becomes darker than the setpoint.

4. The method of claim 1, wherein sending the command comprises, if it is determined that the luminance of the lit space becomes brighter than the setpoint, sending a light-off control command to deactivate the lighting or reduce a brightness of the lighting.

5. The method of claim 1, wherein sending the command comprises, if it is determined that the luminance of the lit space becomes darker than the setpoint, sending a light-on control command to activate the lighting or increase a brightness of the lighting.

6. The method of claim 1, further comprising:
   if the event message is an event message related to a DALI system, determining whether an event corresponding to a case where set light sensor parameters of the light sensor have been lost has been generated or an event corresponding to a case where the set light sensor parameters have been changed by another apparatus for controlling lighting has been generated based on the event message;
   if it is determined that the event corresponding to the case where set light sensor parameters of the light sensor have been lost has been generated, setting the light sensor to set values of the light sensor that have been previously stored using a light sensor parameter setting command; and
   if it is determined that the event corresponding to the case where the set light sensor parameters have been changed, confirming information about the changed set parameters using a light sensor parameter request command.

7. The method of claim 1, wherein sending the command is performed using a control group address.

8. The method of claim 1, wherein the setpoint is set using a relative brightness to a maximum brightness of the lit space where the light sensor has been installed.

9. An apparatus for controlling lighting, comprising:
   a reception unit configured to receive an event message from a light sensor;
   a determination unit configured to determine whether the event message is an event message attributable to a change in luminance or an event message related to a DALI system;
   a state determination unit configured to, if it is determined that the event message is the event message attributable to a change in the luminance, determine an luminance change state of a lit space using the event message attributable to a change in the luminance; and
   a lighting control command transmission unit configured to send a lighting control command corresponding to the luminance change state using a control group address.

10. The apparatus of claim 9, wherein the state determination unit, if a first event message, corresponding to a luminance change from a state darker than a minimum setpoint to a state brighter than the minimum setpoint, and a second event message, corresponding to a luminance change from a state darker than a maximum setpoint to a state brighter than the maximum setpoint, are continuously received, determines that the luminance of the lit space becomes brighter than the setpoint.

11. The apparatus of claim 9, wherein the state determination unit, if a first event message, corresponding to a luminance change from a state brighter than a maximum setpoint to a state darker than the maximum setpoint, and a second event message, corresponding to a luminance change from a state brighter than a minimum setpoint to a state darker than the minimum setpoint, are continuously received, determining the luminance of the lit space becomes darker than the setpoint.

12. The apparatus of claim 9, wherein the lighting control command transmission unit, if the luminance change state is a state in which the luminance of the lit space becomes brighter than the setpoint, sends a light-off control command to deactivate lighting or reduce a brightness of the lighting.

13. The apparatus of claim 9, wherein the lighting control command transmission unit, if the luminance change state is a state in which the luminance of the lit space becomes darker than the setpoint, sends a light-on control command to activate the lighting or increase a brightness of the lighting.

14. The apparatus of claim 9, further comprising:
   an event determination unit configured to, if the event message is an event message related to the DALI system, determine whether an event corresponding to a case where set light sensor parameters of the light sensor have been lost has been generated or an event corresponding to a case where the set light sensor parameters have been changed by another apparatus for controlling lighting has been generated based on the event message; and a parameter command transmission unit configured to send a light sensor parameter command based on results of the determination of the event determination unit.

15. The apparatus of claim 14, wherein the parameter command transmission unit is further configured to, if it is determined that the event corresponding to the case where set light sensor parameters of the light sensor have been lost has been generated, set the light sensor to set values of the light sensor that have been previously stored using a light sensor parameter setting command.

16. The apparatus of claim 14, wherein the parameter command transmission unit is further configured to, if it is determined that the event corresponding to the case where the set light sensor parameters have been changed, confirm information about the changed set parameters using a light sensor parameter request command.

17. The apparatus of claim 14, wherein the set light sensor parameters comprise the setpoint, a setpoint tolerance, and the control group address.

18. The apparatus of claim 9, wherein:
the state determination unit requires the setpoint used to determine the luminance change state; and
the setpoint is set using a relative brightness to a maximum brightness of the lit space where the light sensor has been installed.

* * * * *